O. F. IMMELL.
MINNOW BAIT.
APPLICATION FILED OCT. 12, 1909.
974,493.
Patented Nov. 1, 1910.
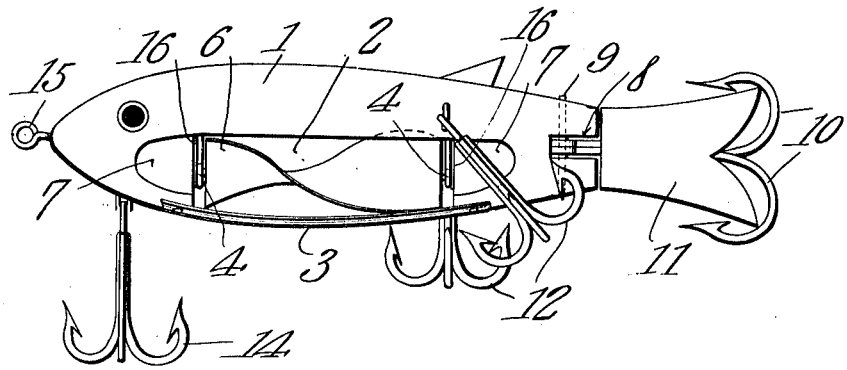
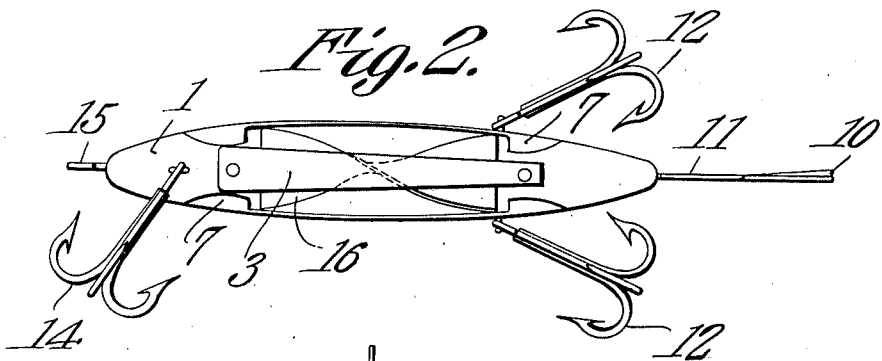
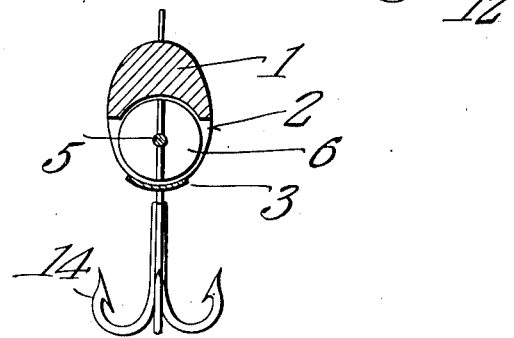
Inventor
Omer F. Immell.
Witnesses
By C. A. Snow & Co.
Attorneys

UNITED STATES PATENT OFFICE.

OMER F. IMMELL, OF BLAIR, WISCONSIN.

MINNOW-BAIT.

974,493.  Specification of Letters Patent.  Patented Nov. 1, 1910.

Application filed October 12, 1909. Serial No. 522,280.

*To all whom it may concern:*

Be it known that I, OMER F. IMMELL, a citizen of the United States, residing at Blair, in the county of Trempealeau and State of Wisconsin, have invented a new and useful Minnow-Bait, of which the following is a specification.

The objects of the invention are, generally, the provision, in a merchantable form, of a device of the above mentioned class, which shall be inexpensive to manufacture, facile in operation, and devoid of complicated parts; specifically, the provision of an artificial bait including a body of novel and improved construction, and a rotating lure which is adapted to be mounted in the body, the body being so constructed that, as the same moves through the water, the water will readily actuate the lure to its rotation.

Another object is the provision of a pivotally mounted tail of novel and improved construction.

With these and other objects in view, the invention consists in the novel construction and arrangement of parts, hereinafter described, and delineated in the accompanying drawings, it being understood that since the drawings show but one form of the invention, changes may be made, within the scope of what is claimed, without departing from the spirit of the invention.

Similar numerals of reference are employed to denote corresponding parts throughout the several figures of the drawings, wherein;

Figure 1 is a side elevation; Fig. 2 is a bottom plan; and Fig. 3 is a transverse section along the rear end of the lure.

The invention includes, as a primary element, a body 1, which may be of any form, and fashioned from any desired material, the body being so constructed, ornamented, and provided with tail and eyes, that it shall resemble closely a fish. Intermediate its ends and upon its lower surface, the body 1 is cut away, approximately to its longer axis, as denoted by the numeral 2. This opening 2 extends entirely through the body, transversely, and is closed along its lower side by a plate 3, terminally mounted upon the body, this plate 3 representing the belly of the fish. It is, of course, obvious that if desired the plate 3 may constitute an integral part of the body 1.

Located within the opening 2 adjacent the ends thereof, are hangers 4 in which are journaled short stub shafts 5 rigidly secured to the ends of a rotating lure 6. This lure 6 is preferably fashioned from a sheet of metal bent into spiral form and housed entirely within the contour of the body 1.

There are oppositely disposed channels 7 in the side faces of the body at both ends of the opening 2, the channels communicating with said opening. Those channels 7 which are disposed opposite to each other, transversely of the body, converge as they approach the opening, the channels which are located adjacent the head of the device, serving to permit access of water to the lure 6, and the channels 7 which are located adjacent the tail, serving to permit the water to flow away from the lure 6 after the rotation thereof has been accomplished.

The rear end of the body 1 is transversely slotted, as denoted by the numeral 8, to form arms, and through these arms, and through the opening 8 is extended an upright pintle 9, adapted to engage the eyes of a pair of hooks 10, disposed in a common plane and normally standing upright as the device moves through the water. A plate 11 is provided and fashioned to simulate the tail of a fish and this plate 11 is secured to the shanks of the hooks 10, the plate terminating within the bends of the hooks, and the barbs of the hooks being located in a common plane with the plate 11 and disposed intermediate the ends of the plate and spaced from the upper and lower edges thereof.

Gang hooks 12 may be pivotally suspended from the body 1 adjacent the rear end of the lure 6, and a gang hook 14 may be pivotally mounted upon the body 1 to depend from the lower surface thereof adjacent the forward end of the body. The nose of the body may carry a ring 15 or like device adapted to be assembled with a swivel or with a leader, and it is, of course, to be understood that the entire device may be ornamented in any desired combination of colors.

By locating the lure 6 entirely within the contour of the body, the lure is not likely to become broken or bent when the device is struck by a fish. Moreover, owing to the location of the lure 6, the same is not likely to be fouled by weeds. As the lure rotates, it will give to the device the appearance of a live fish, the fins of which are in active motion.

Owing to the location of the lure 6, the fish will strike at the bait adjacent the middle thereof, and ordinarily will be caught by the hooks 12. When the fish thus strikes the bait, the rear end of the body 1 will tend to move away from the fish under the impulse of the strike, the pivoted tail 10 moving at its free end toward the fish. By this construction, should the fish not become engaged by the hooks 12, the hooks 10 will be so positioned that they will be likely to impale the fish.

Owing to the manner of mounting the plate 11 upon the hooks 10, should the fish strike at the tail of the bait, the plate 11 will not be likely to be bent or broken.

If desired, thrust bearings for the ends of the shafts 5 may be provided, the same taking the form of plates 16 mounted upon the body at the ends of the opening 2.

Having thus described my invention, what I claim is:

A device of the class described comprising a body having an opening therethrough from one of the side faces of the body to the other; and a spiral lure disposed in said opening and rotatably supported in the body; there being oppositely disposed channels in the side faces of the body at both ends of the opening and communicating therewith, the channels which are disposed opposite to each other, transversely of the body, converging as they approach the opening.

In testimony that I claim the foregoing as my own, I have hereto affixed my signature in the presence of two witnesses.

OMER F. IMMELL.

Witnesses:
 E. E. BLIX,
 D. BENRUD.